United States Patent Office 3,354,065
Patented Nov. 21, 1967

3,354,065
METHOD OF PRODUCING ALCOHOL CONTAINING CHLORINE
Tatsuo Matsuda, Showa-ku, Nagoya-shi, and Takaari Yumoto, Mizuho-ku, Nagoya-shi, Japan, assignors to Agency of Industrial Science & Technology, Chiyoda-ku, Tokyo, Japan, a corporation of Japan
No Drawing. Filed Oct. 8, 1962, Ser. No. 229,191
1 Claim. (Cl. 204—158)

The present invention relates to a method of producing a new type alcohol containing chlorine. Heretofore, there have been used for producing the alcohol containing chlorine in the following methods such as, involving addition of hypochlorite (HClO) to olefins, selective reduction method of chlorinated olefins or ketone, and/or a method of hydrolysis after chlorination of chlorinated olefin or ketone in glacial acetic acid.

It is one object of the present invention to provide a type alcohol containing chlorine by a simple method and the feature of the invention is to compose 1:1 addition product of saturated alcohol containing chlorine $$(CHCl_2CClROH)$$

or unsaturated alcohol containing chlorine $$(CCl_2\!\!=\!\!CClROH)$$

by irradiating the ionizing radioactive rays on the mixture of tetrachloroethylene and ROH which represents alcohol. In the description, primary alcohol or secondary alcohol may be used as ROH.

It is another object of the present invention to provide the following chemical reaction formula as,

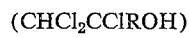
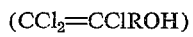
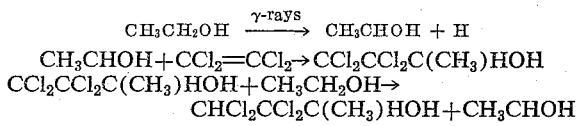

In accomplishing these objects, it has been found that the yield of the alcohol containing chlorine invites better result by mixing of surplus alcohol against tetrachloroethylene, the mole ratio of which is generally applied at the rate of 1:1 to 1:10 against ROH.

Ionizing irradiations when utilized in the present invention means X-rays, $\gamma$-rays, $\beta$-rays, accelerated electron rays, proton rays and neutron rays and besides, the irradiating duration is effected by such factors as the strength of the radioactive rays, kind of alcohol, reaction temperature etc., and further, the yield of the objective products depends more on quantity of radioactive rays than on strength of radioactive rays, and that the atmospheric condition in which irradiation reaction proceeds may be better in an inert nitrogen gaseous condition.

We have also found in accordance with present invention that although the reaction speed slows down under the ordinary air condition, it is not an absolute necessity to substitute air to an inert gaseous condition.

Since the yield of alcohol containing chlorine in accordance with present invention is very fine, we have found that we would utilize the unreacted materials from the irradiated mixture.

The procedures of separation between saturated alcohol containing chlorine and unsaturated alcohol containing chlorine from the raw oil is carried out by the well known art of fractional distillation.

The quantitative analysis of the two kinds of the alcohols in raw oil could be carried out by gas chromatography with silicone grease as a filler.

In accordance with the present invention, we have found that the higher the temperature of irradiation, the greater the yield, and when the irradiation temperature is low saturated alcohol containing chlorine is the main product. Unsaturated alcohol containing chlorine is a main product when irradiation temperature is high.

It will be understood that the table shows the relation between the irradiation temperature and the content of both kinds of alcohol containing chlorine.

TABLE

| Irradiation Temperature (° C.) | Percent of Contents | |
| --- | --- | --- |
| | Saturated alcohol containing chlorine | Unsaturated alcohol containing chlorine |
| Room Temperature | 84.4 | 14.5 |
| 60 | 46.2 | 51.8 |
| 80 | 42.4 | 56.0 |

The invention will be further illustrated, but is not limited to the following examples, in which the quantities are stated in parts by weight, unless otherwise indicated.

*Example 1*

This is an example of the preparation of unsaturated alcohol containing chlorine and saturated alcohol containing chlorine.

82.5 parts by weight of tetrachloroethylene are mixed with one hundred and twelve (112) parts by weight of methylalcohol.

The mixture is then irradiated in an inert nitrogen gaseous atmosphere by Co-60 $\gamma$-rays at the rate of $5.7\times10^4 R\gamma/hr.$ for the period of one hundred and twenty-one (121) hours.

From this irradiated product, tetrachloroethylene and methylalcohol are recovered by distillation and we obtained twelve (12) parts by weight of raw oil at 93–99° C./15 mm. Hg.

By applying the technique of fractional distillation to the raw oil, we obtained zero point five (0.5) part of Fraction No. 1 at 81.5°/15 mm. Hg and eleven (11) parts by weight of Fraction No. 2 at 97–99° C./15 mm. Hg.

The Fraction No. 1 is unsaturated alcohol containing chlorine.

The Fraction No. 2 is saturated alcohol containing chlorine which is a colorless liquid with $d_4^{20}$ 1.5977 and $N_D^2 D$ 1.5122. The chemical analysis of the Fraction No. 2 on a percentage basis is as follows:

| | Percent |
| --- | --- |
| Carbon | 18.64 |
| Hydrogen | 2.077 |
| Chlorine | 70.67 |

The chemical formula of this product is

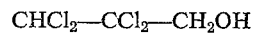

*Example 2*

This is an example of the preparation of unsaturated alcohol containing chlorine and saturated alcohol containing chlorine under ordinary atmospheric air conditions.

We used the same quantities of raw materials and obtained 6.4 parts by weight of raw oil.

*Example 3*

This example is given to illustrate the preparation of unsaturated alcohol containing chlorine and saturated alcohol containing chlorine from tetrachloroethylene and ethylalcohol.

82.5 parts by weight of tetrachloroethylene are mixed with ninety two (92) parts by weight of ethylalcohol.

The mixture is then irradiated in an inert nitrogen gaseous atmosphere by Co–60 γ-rays at the rate of $3 \times 10^4 R\gamma$/hr. for the period of 47 hours.

From the irradiated product we obtained 16.6 parts by weight of raw oil at 95–107° C./15 mm. Hg.

By fractional distillation, we obtained 2.4 parts by weight of the Fraction No. 1 at 85–86.5° C./15 mm. Hg, and 14.6 parts by weight of the Fraction No. 2 at 106° C./15 mm. Hg.

The chemical analysis by percentage of the Fraction No. 1 is as follows:

|  | Percent |
|---|---|
| Carbon | 27.38 |
| Hydrogen | 2.87 |
| Chlorine | 60.63 | and the chemical formula of the Fraction No. 1 is $CCl_2=CClCH(CH_3)OH$. This is unsaturated alcohol containing chlorine.

The Fraction No. 2 is a colorless liquid with tedious odor and its chemical analysis by percentage of weight is as follows:

|  | Percent |
|---|---|
| Carbon | 22.76 |
| Hydrogen | 2.85 |
| Chlorine | 66.93 |

The chemical formula of the Fraction No. 2 is $CHCl_2CCl_2CH(CH_3)OH$; this is alcohol containing saturated chlorine.

Example 4

This example is given to illustrate the preparation of unsaturated alcohol containing chlorine and saturated alcohol containing chlorine from tetrachloroethylene and n-propyl alcohol. 82.5 parts by weight of tetrachloroethylene are mixed with one hundred and twenty (120) parts by weight of n-propyl-alcohol. The mixture is irradiated by $3.7 \times 10^5 R\gamma$/hr. γ-rays for the period of nineteen (19) hours.

After recovering tetrachlorethylene and n-propyl alcohol, we obtained 10.4 parts of raw oil at 97–117° C./15 mm. Hg. By applying the technique of fractional distillation to this raw oil, we obtained 5.0 parts by weight of the Fraction No. 1 at 90–91.5° C./15 mm. Hg and 5.4 parts by weight at 113° C./15 mm. Hg.

The percentage of chlorine in the Fraction No. 1 is 55.6%. The Fraction No. 1 is unsaturated alcohol containing chlorine. The chemical analysis of the Fraction No. 2 is as follows:

|  | Percent |
|---|---|
| Carbon | 27.17 |
| Hydrogen | 3.615 |
| Chlorine | 62.99 | and its chemical formula works out as follows:

$$CHCl_2CCl_2CH(C_2H_5)OH$$

and this is saturated alcohol containing chlorine.

Example 5

This example is given to illustrate the preparation of unsaturated alcohol containing chlorine and saturated alcohol containing chlorine from tetrachloroethylene and n-butylalcohol.

82.5 parts by weight of tetrachloroethylene are mixed with one hundred and forty-eight (148) parts by weight of n-butylalcohol.

The mixture is then irradiated with $5.5 \times 10^4 R$/hr. γ-rays for the period of one hundred and twenty-five (125) hours.

From the irradiated mixture, we obtained 4.8 parts of the Fraction No. 1 at 93° C./15 mm. Hg and 2.5 parts of the Fraction No. 2 at 123° C./15 mm. Hg.

The percentage of chlorine content in the Fraction No. 1 is 52.24% and is unsaturated alcohol containing chlorine.

The chemical analysis of the Fraction No. 2 is as follows:

|  | Percent |
|---|---|
| Carbon | 31.61 |
| Hydrogen | 4.31 |
| Chlorine | 58.17 | and its chemical formula is as follows:

$$CHCl_2CCl_2CH(C_3H_7)OH$$

and this is alcohol containing saturated chlorine.

While we have disclosed several embodiments of the present invention, it is to be understood that these embodiments are given by example only and not in a limiting sense, the scope of the present invention being determined by the objects and the claim.

We claim:

A method of manufacturing alcohol containing chlorine selected from the groups consisting of $CHCl_2CCl_2ROH$ and $CCl_2=CClROH$ which comprises the application of irradiation by ionizing radioactive rays on the mixture of tetrachloroethylene and alcohols (ROH).

References Cited

Muramatus: Journal Organic Chemistry, vol. 27 (July 1962), pages 2325 and 2326.

HOWARD S. WILLIAMS, *Primary Examiner.*

JOHN H. MACK, *Examiner.*